United States Patent
Streander

[11] 3,785,245
[45] Jan. 15, 1974

[54] MULTI-CURVE GENERATOR
[75] Inventor: George W. Streander, Alamogordo, N. Mex.
[73] Assignee: Design Systems, Inc., Alamogordo, N. Mex.
[22] Filed: Sept. 3, 1971
[21] Appl. No.: 177,699

[52] U.S. Cl.............. 90/11 R, 90/58 B, 33/27 F, 408/90, 51/240 A
[51] Int. Cl............................................. B23q 1/16
[58] Field of Search............ 90/11 R, 58 R, 58 C, 90/21 D, 58 B; 33/27 F; 29/38 C; 408/71, 90; 51/240 A

[56] References Cited
UNITED STATES PATENTS
| | | | |
|---|---|---|---|
| 880,796 | 3/1908 | Horrocks | 33/27 F |
| 275,604 | 4/1883 | Deboutteville | 90/58 B |

FOREIGN PATENTS OR APPLICATIONS
| | | | |
|---|---|---|---|
| 64,083 | 5/1955 | France | 33/27 F |
| 669,826 | 4/1952 | Great Britain | 33/27 F |
| 1,049,893 | 1/1954 | France | 33/27 F |

Primary Examiner—Andrew R. Juhasz
Assistant Examiner—Z. R. Bilinsky
Attorney—Clarence A. O'Brien et al.

[57] ABSTRACT

A cutting tool automatically traces a path of variable curvature on a workpiece to which movement is imparted. The motion of the workpiece relative to the tool is controlled by a pair of fixedly spaced pivots with respect to which the workpiece is slidably and pivotally constrained. The pivots lie on a circular arc of selected radius with respect to which the cutting tool is maintained in adjusted radially spaced relation.

9 Claims, 8 Drawing Figures

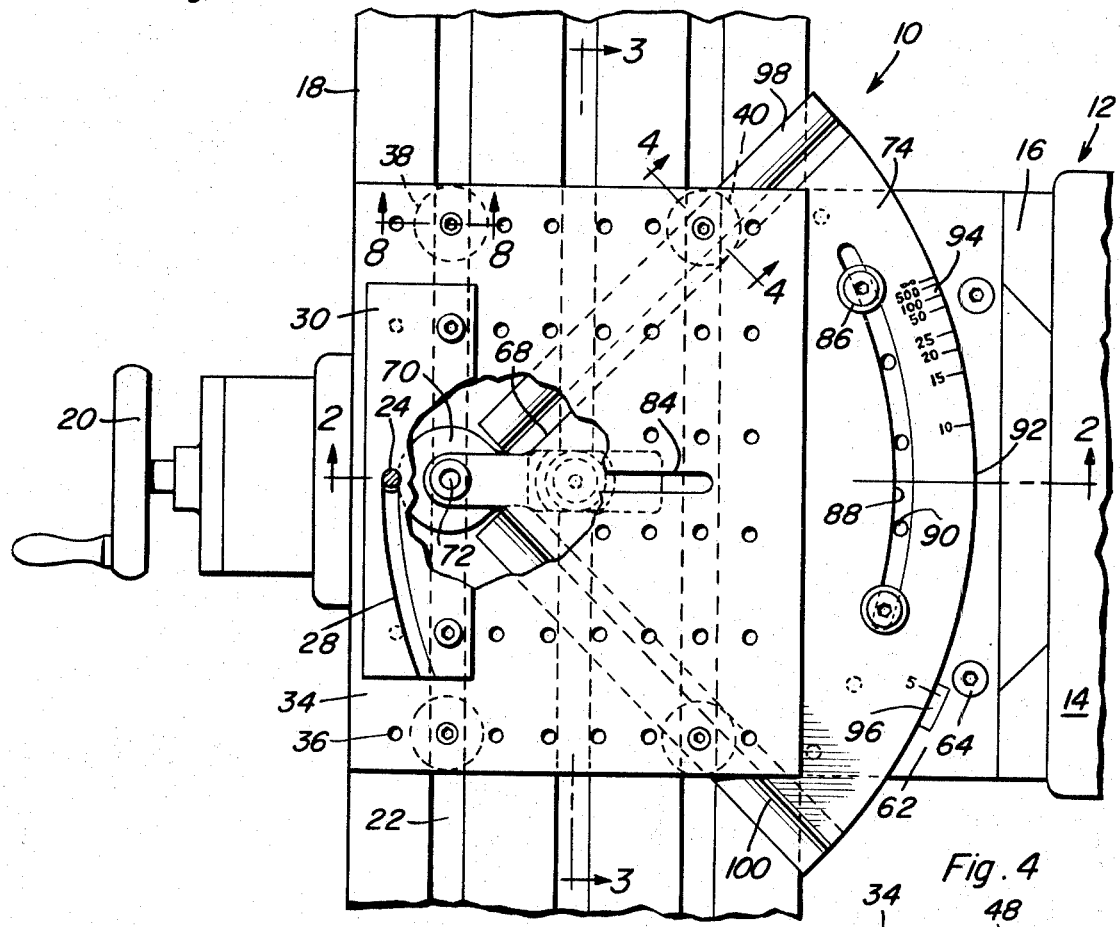
Fig. 1
Fig. 4
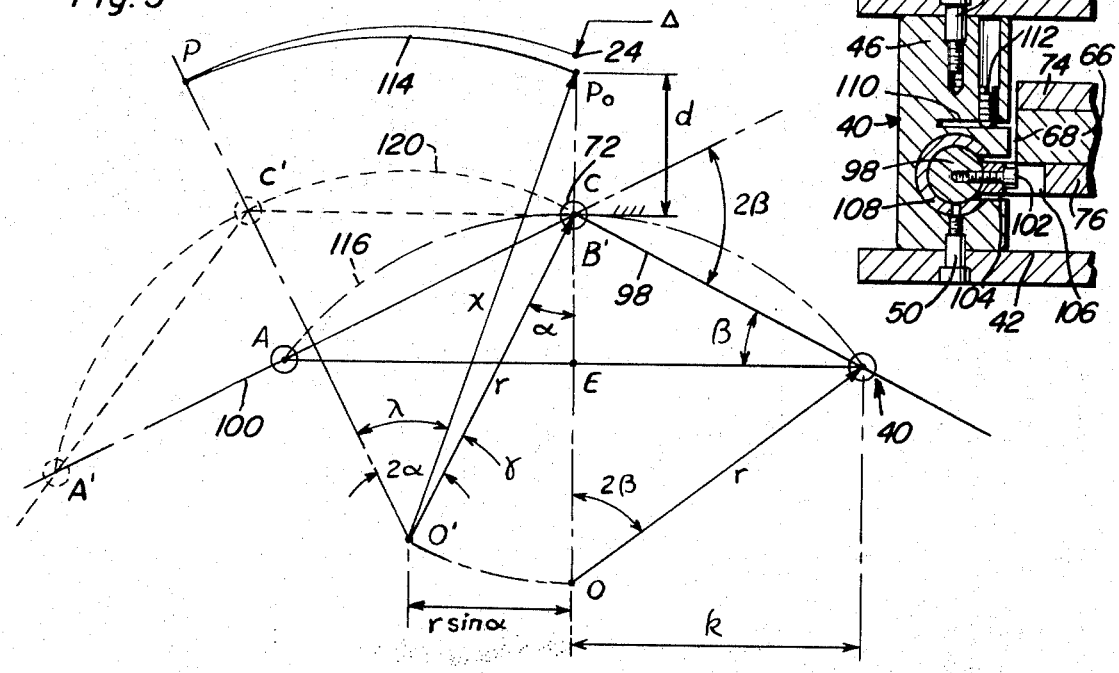
Fig. 5

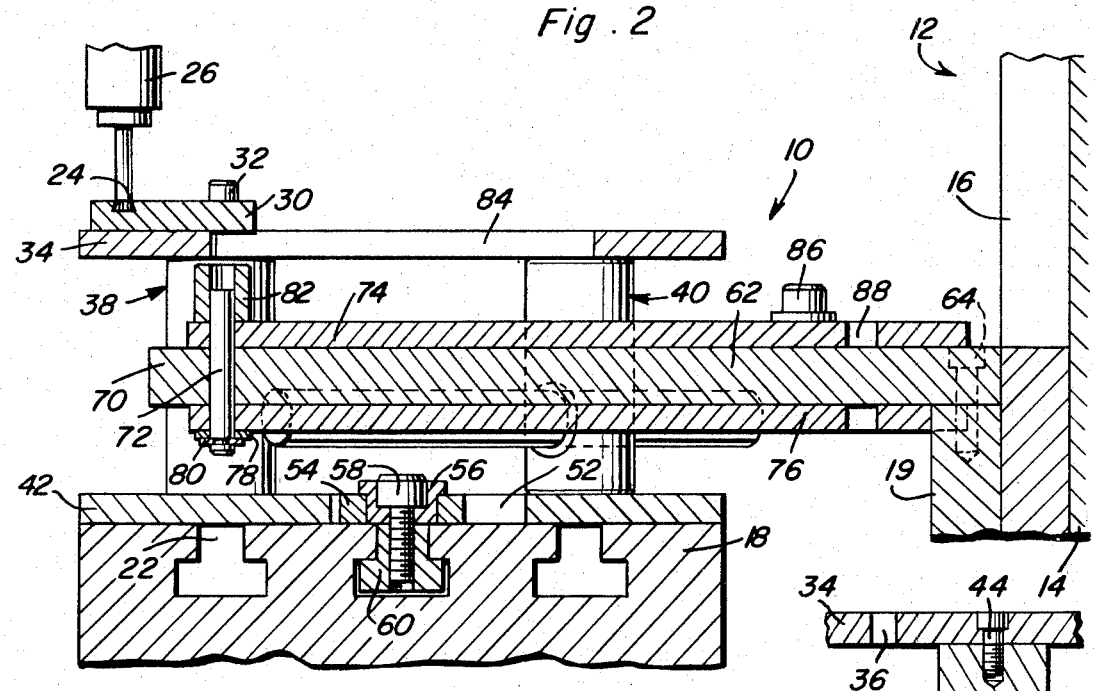
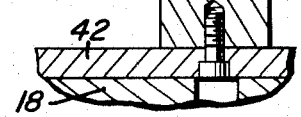
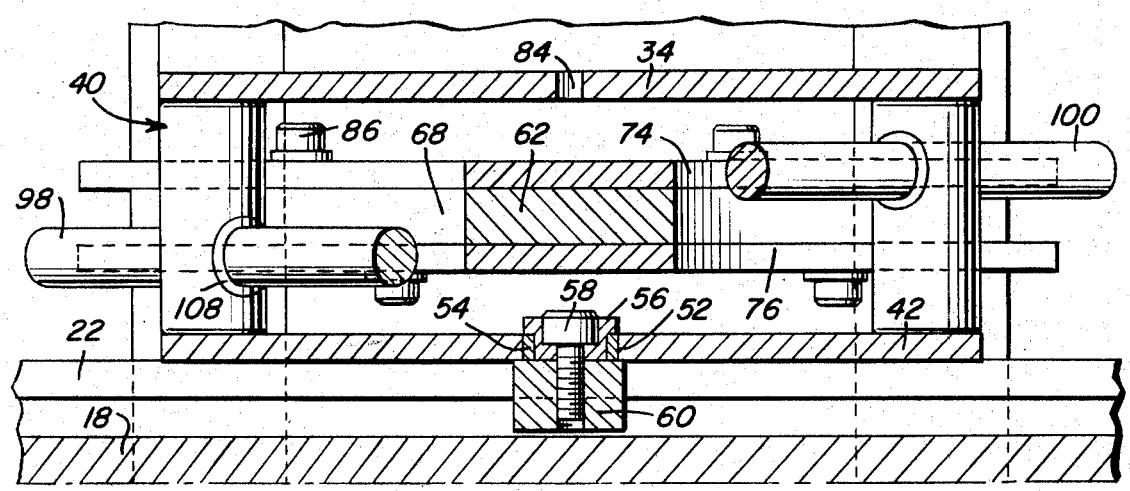

MULTI-CURVE GENERATOR

This invention relates in general to the generation of a curve of varying radius on a work surface and more particularly to a machine tool attachment for guiding relative movement between a cutting tool and a workpiece in order to cut or trace a groove or formation of desired curvature.

Vertical milling machines or grinders are commonly utilized to cut or grind circular arcs or compound curves on the surface of or along the edge of a workpiece. The formation or cutting of such curves with any degree of precision, is extremely difficult even for experienced machinists or machine tool operators. A most common practice in this regard is to inscribe the arc on the workpiece and then manually guide the mill or grinder table in two coordinate directions simultaneously in order to follow the inscribed arc with the tool. Another practice is to allow the machine table to be guided by a long rigid pivot bar of the required length corresponding to the radius of curvature of the cut. The foregoing practices as well as some other similar techniques do not usually result in precision cuts. It is therefore an important object of the present invention to provide an accessory for machine tools and in particular a vertical milling machine or grinder which will enable the machinist to cut a precision arc or compound curve as required. The accessory automatically guides movement of the workpiece relative to the rotary cutting tool or grinding wheel in order to produce a curvature in accordance with adjusted settings of the accessory device.

In accordance with the present invention, a work table is supported on and drivingly interconnected with the longitudinally movable milling table of a vertical milling machine or grinder so that the longitudinal movement of the milling table is transmitted to a parallel spaced work table which may also undergo cross travel displacement relative to the milling table. A guide structure is adjustably and fixedly secured to the vertical column of the milling machine and supports a pair of pivot assemblies with respect to which the work table is slidably and pivotally displaceable in order to constrain its movement. The pivot assemblies are fixedly spaced from each other by an adjusted amount determined by the angular relationship between the pivot assembly axes and a hinge axis, all of which axes intersect the planar surface of the work table at points that lie on an arc of constant radius. The tool axis intersects the work table surface in radially spaced relation to the arc so that when the work table is displaced by longitudinal movement of the milling table to which it is operatively connected, a curve of varying radius will be generated or traced by the tool axis relative to a workpiece fixedly mounted on the work table surface. The spacing or angular relationship between the pivot assemblies may be adjusted in order to vary the constant radius of curvature of the circular arc and radially spacing of the arc from the tool axis in order to obtain the desired curvature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a portion of a vertical milling machine with the accessory of the present invention attached.

FIG. 2 is a partial side sectional view taken substantially through a plane indicated by section line 2—2 in FIG. 1.

FIG. 3 is a partial front sectional view taken substantially through a plane indicated by section line 3—3 in FIG. 1.

FIG. 4 is an enlarged partial sectional view taken substantially through a plane indicated by section line 4—4 in FIG. 1.

FIG. 5 is a kinematic diagram illustrating the geometrical relationships associated with the present invention.

FIGS. 6 and 7 are simplified diagrammatic views showing the device of the present invention in two different phase positions.

FIG. 8 is an enlarged partial sectional view taken substantially through a plane indicated by section line 8—8 in FIG. 1.

Referring now to the drawings in detail, FIGS. 1, 2 and 3 illustrate a typical embodiment of the present invention in the form of an accessory attachment generally referred to by reference numeral 10 installed on a vertical type of milling machine generally referred to by reference numeral 12. The milling machine includes a vertical column 14 having a dovetail slide 16 on which the knee of the milling machine is supported in a vertically adjusted position supporting thereabove the milling table 18 which is longitudinally displaceable by a table feed mechanism (not shown) in a manner well known. The milling table is furthermore displaceable laterally by a cross feed handle 20 extending from the knee of the milling machine in a manner also well known. The milling table 18 is provided with the usual T slot grooves 22. Thus, the milling table 18 is displaceable by the machine operator in perpendicular directions relative to a rotating tool such as the end mill cutter 24 as more clearly seen in FIG. 2 depending downwardly from a chuck 26 supported for rotation about a stationary vertical axis by the spindle portion of an overhead ram (not shown) of the machine tool.

As more clearly seen in FIGS. 1 and 2, the tool 24 is adapted to cut a groove 28 of compound curvature on a workpiece 30 secured by clamp bolt fasteners 32 to a work table 34 on which a plurality of workpiece clamping holes 36 are formed.

The work table 34 is supported in parallel spaced relation to the milling table 18 by means of a pair of spacer assemblies 38 and a pair of pivot assemblies 40 so as to present an upper planar work surface perpendicular to the vertical tool axis about which the end mill cutter 24 is rotated. The work table is operatively connected by the spacers 38 and pivot assemblies 40 to the milling table 18 through a floating driver plate 42. As shown in FIG. 8, the spacers 38 are fixedly connected to the work table 34 and driver plate 42 by fasteners 44 while the pivot assemblies 40 as shown in FIG. 4, include cylindrical pivot members 46 pivotally connected to the work table 34 and the driver plate 42 by pivot bolts 48 and 50. The pivot bolts 48 and 50 are axially aligned so as to establish a pivotal axis perpendicular to the planar surfaces of the work table 34 and milling table 18.

As more clearly seen in FIGS. 2 and 3, the driver plate 42 is provided with a drive slot 52 within which a drive element 54 is received for transmitting drive from the milling table, when displaced longitudinally, to the driver plate 42 and the work table 34 connected thereto through the spacers 38 and pivot assemblies 40. The drive element 54 is rotatably mounted on a roller bearing 56 secured by the fastener 58 to a clamping element 60 seated within one of the grooves 22 of the milling table. It will therefore be apparent, that longitudinal movement imparted to the milling table 18 will be transmitted to the work table 34 which may, however, be displaced relative to the milling table 18 in a cross travel direction by virtue of the drive slot connection between the driver plate 42 and the milling table 18.

As hereinbefore indicated, the milling table 18 supported in a vertically adjusted position on the vertical column 14 by means of the knee 19, is closely spaced below a support plate 62 which is secured to the knee adjacent the dovetail slide 16 by means of fasteners 64. The support plate 62 extends thus from the vertical column in parallel spaced relation to the milling table 18 vertically between the driver plate 42 and the work table 34 as more clearly seen in FIG. 2. The support plate has forwardly converging edges 68 as shown in FIGS. 1 and 3 which extend to an enlarged end portion 70 of the support plate through which a hinge pin 72 extends. The hinge pin 72 is thus fixedly supported in order to establish a vertical hinge axis perpendicular to the planar surface of work table 34. The hinge pin 72 furthermore holds assembled on the support plate 62, a top angle plate 74 and a bottom angle plate 76 which are pivotally adjusted about the hinge axis. A washer 78 bears against the bottom angle plate 76 and is held assembled on the lower end of the hinge pin by a spring retainer 80 as shown in FIG. 2. The top angle plate 74 through which the hinge pin 72 extends rests on the support plate. The hinge pin furthermore extends upwardly into an indicator bushing 82 supported on the top angle plate 74 and adapted to be aligned with a slot 84, formed in the work table 34, when in an initial position relative to the support plate 62 and the angle plates.

The angle plates are locked in an angular adjusted position relative to the axis through the hinge pin 72 by means of angle calmp assemblies 86 extending through angle adjustment slots 88 formed in the angle plates and apertures 90 formed in the support plate as more clearly seen in FIG. 1. The rear arcuate edge 92 of the top angle plate 74 is provided with a radius scale 94 as shown in FIG. 1 which is aligned with an index marker formation 96 fixed to the support plate 62 in order to enable the operator to adjust the angular relationships between the angle plates.

A pair of bars or rods 98 and 100 are respectively secured to the top and bottom angle plates along the converging edges 68. Each bar 98 and 100 is secured to its associated angle plate by means of threaded fasteners 102 as shown in FIG. 4. For this purpose, slots 106 are formed in the pivot members 46 of the pivot assemblies into which one of the angle plates extends, the angle plate being provided with an opening 106 through which the fasteners 102 are inserted. Further, as shown in FIG. 4, each of the bars 98 and 100 slidably extends through one of the pivot members 46. A slide bearing bushing 108 is provided for sliding contact with the bar and is locked to the pivot member 46 by the pivot bolt fastener 50. In order to adjust the diameter of the opening within which the slide bushing 108 is received, an adjustment slot 110 is formed in the pivot member adjacent to the slide bushing and a diameter adjusting screw element 112 is threadedly received within a vertical bore and projects transversely through the slot 110 for engagement with one surface of the slot. It will therefore be apparent that the pivot assemblies are effective to pivotally interconnect the work table 34 with the stationary support plate 62 through the angle plates 74 and 76 as well as to permit slidable displacement of the work table relative to the stationary support plate 62 along the longitudinal axes of the bars 98 and 100, which longitudinal axes intersect at the axis of the hinge pin 72. The pivotal and slidable relationship between the pivot assemblies 40 and the stationary support plate 62 will accommodate angular adjustment of the angle plates 74 and 76 to which the bars are connected relative to the support plate upon loosening of the clamp assemblies 86. The angle plates may therefore be locked in an adjusted angular position as read on the scale 94. In an initially aligned position of the work table 34 as shown in FIG. 1, angular adjustment of the bars 98 and 100 and attached angle plates will be operative through the pivot assemblies 40 to displace the work table 34 forwardly from the position shown with the top of the hinge pin 72 visible within the slot 84 in the work table. Thus, in this initially aligned position, adjustments are made by the machine operator in obtaining a desired angular relationship and longitudinal spacing between the pivot assemblies 40. Also, the radial spacing of the workpiece and the vertical tool axis may be adjusted relative to the hinge pin axis along the longitudinal axis of the slot 84. This initial aligned position of the work table relative to the support plate is diagrammatically illustrated in FIG. 6, the tool axis at 24 being radially spaced from the axis of the hinge pin 72 by a distance (d). This radial spacing between the tool and hinge pin axes is maintained as the work table 34 is displaced by linear movement imparted to the milling table 18 as shown in FIG. 7. In view of the pivotal and slidable connections established by the pivot assemblies 40 between the work table 34 and the support plate 62, longitudinal movement imparted to the milling table 18 produces a constrained displacement of the work table 34 as depicted in FIG. 7 causing the tool axis to trace a curved path 114 corresponding to the arcuate groove 28 cut in the workpiece 30 as shown in FIG. 1.

FIG. 5 kinematically depicts the arrangement illustrated in FIGS. 1, 2, 3, 6 and 7 wherein the bars 98 and 100 are adjusted to a predetermined angular relationship relative to the axis of the hinge pin 72 intersecting the work surface plane at point (C). The pivot axes at the pivot assemblies 40 intersect the work surface plane at points (A) and (B) which are fixedly spaced from each other by a distance ($2k$) as indicated on the diagram of FIG. 5. The angular relationship between the bars 98 and 100 is indicated by an external angle ($2\beta$). The pivot points A and B and the hinge point C define a circular arc ACB on the work surface plane having a center of curvature at point (0) in the initial aligned position with a constant radius of curvature (r) for the particular setting of the angle plates as aforementioned. Since the distance (k) is the base leg EB of right triangle BCE, and since angle EOB of isoceles triangle OCB is $2\beta$, then $\sin 2\beta = K/R$. The radius of curvature (r) may therefore be selected by the setting of angle $2\beta$ between (k−t) and 0 corresponding to a minimum radius and a maximum radius respectively, where (t) is the radius of the cutting tool.

Where the tool axis coincides with the point C, the arc generated on the work table by longitudinal movement of the underlying mill table 18, is an arc 116 of constant radius. It has however been found that when the tool axis located initially at a tracing point $P_0$ as shown in FIG. 5, is outside or inside the circular arc 116 on which pivot points A and B and hinge point C lie, the compound curve 114 is generated, having a varying radius X as the work table surface is displaced relative to the hinge pin corresponding to relative displacement of hinge point C to point C' as depicted in FIG. 5. As a result of this relative displacement between the work table surface and the hinge pin, the hinge point C moves along the circular arc 120 of constant radius (r) to position C'. Inasmuch as the pivot points A and B are fixedly spaced from each other, and occupy a fixed angular relationship to the hinge point C, in the position C' of the hinge pin, the pivot points will occupy positions A' and B' as also shown in FIG. 5. Where the tool axis is spaced by a distance (d) from the hinge point C, the center of curvature O of the circular arc 116 will shift to position O' corresponding to the position of the hinge point at C'. The center of cuvature is displaced along a circular arc from point O to O' by an angle ($\alpha$) relative to the hinge point at the initial location C.

Assuming the tool axis is located outside of the circular arc on which the pivot points and hinge point lie, the compound curve 118 generated deviates from a circular arc of radius ($r + d$) by an amount ($\Delta$), $\Delta$ being a function of the angle ($\gamma$) as shown in FIG. 5. The angle $\gamma$ is the relative angular displacement of the tracing points P of the tool axis having a varying radius axis as aforementioned, while $\alpha$ is the angular displacement of the center of curvature of constant radius $r$ relative to the hinge point. From a consideration of FIG. 5, it will be apparent that $\lambda = 2\alpha \pm \gamma$. At the initial position of the tracing point $P_0$, $\Delta = r + d - x$ and $x = (r^2 + 2rd \cos \alpha + d^2)^{1/2}$. Alternatively, $\Delta - \Delta^2/2(r+d) = (rd/r+d)(1-\cos\alpha)$. Inasmuch as $\Delta^2 \to 0$, $\Delta \sim (rd/r+d)(1-\cos\alpha)$. Thus, the varying radius $x$ of the compound curvature 114 may be determined in terms of the angular displacement $\alpha$ of the center of curvature of the arc of constant radius $r$ or may be determined as a function of $\alpha$ and $\lambda$ from the foregoing equations.

It will be appreciated from the foregoing, that a compound curve of required curvature may be obtained by location of the tracing point where the tool axis intersects the work table surface radially inside as well as outside of the circular arc on which the pivot points and hinge point lie, by simply adjusting the milling cutter position by means of the overhead ram. The tool axis may also be aligned with the hinge pin in order to generate a curve of constant radius as aforementioned. For a given radial spacing between the hinge pin and tool axes, deviation from a circular arc traced by the tool axis may be controlled by adjustment of the angular relationship of the pivot assemblies to the hinge pin and the spacing therebetween which determines the constant radius of the arc on which the pivot points and hinge point lie.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a milling machine having a movable work table supporting a workpiece on a work plane perpendicular to a tool axis and means for imparting longitudinal movement to the work table, means for milling curves of variable radius on the workpiece comprising at least two guides mounted on the work table fixedly spaced from each other, a pair of bars slidably extending through said guides, hinge means interconnecting the bars at a preselected angle to each other adjacent the workpiece supporting plane and support means holding the hinge means at a fixed location with respect to the tool axis for constraining pivotal and cross travel movement of the work table in response to longitudinal movement imparted thereto to generate a curve at the intersection of the tool axis and the workpiece supporting plane.

2. The combination of claim 1 wherein said tool axis intersects the work plane at a location radially spaced from the projection of a circular arc interconnecting the hinge means and the guides in the work plane.

3. The combination of claim 2 wherein said guides are pivotally connected to the work table for accommodating angular adjustment of the bars relative to the hinge means to preselect the radius of curvature of the circular arc interconnecting the hinge means and the guides.

4. The combination of claim 1 wherein said guides are pivotally connected to the work table for accommodating angular adjustment of the bars relative to the hinge means to preselect the radius of curvature of the circular arc interconnecting the hinge means and the guides.

5. Means for generating a curve on a plane surface of a workpiece in response to relative movement between the surface and a curve tracing point on a tool, comprising support means, means for imparting linear movement to said support means in one direction relative to the tool, means for establishing a hinge point fixedly spaced from the tracing point by an amount (d), guide means operatively positioned relative to the support means and said plane surface for constraining relative movement between the hinge point and the surface to a circular path of constant radius (r) having a movable center of curvature (O), and means supporting the hinge point establishing means for constraining angular movement ($\alpha$) of said center of curvature of constant radius relative to the hinge point at an initial position of the tool.

6. The combination of claim 5 wherein said guide means includes a pair of pivots mounted adjacent the surface at fixedly spaced pivot points, and a pair of bars interconnected at the hinge point and slidably extending through the pivots.

7. The combination of claim 6 wherein the locus of tracing points on the plane surface is a curve having a variable radius which is a determinable function of ($\alpha$).

8. The combination of claim 7 wherein said variable radius deviates from a radius ($r+d$) at the initial position of the tracing point by an amount ($\Delta$) which is a funtion of ($\alpha$).

9. The combination of claim 5 wherein the locus of tracing points on the plane surface is a curve having a variable radius which deviates from a constant radius by an amount ($\Delta$) which approximates ($rd/r+d$)($1-\cos\alpha$).

* * * * *